§

US011263590B2

(12) United States Patent
Verones et al.

(10) Patent No.: US 11,263,590 B2
(45) Date of Patent: Mar. 1, 2022

(54) COGNITIVE ASSESSMENT OF PERMIT APPROVAL

(71) Applicant: International Business Machines Corporation, Armonk, NY (US)

(72) Inventors: John M. Verones, Coquitlam (CA); Michael Bender, Rye Brook, NY (US); Aleem Hooda, Richmond Hill (CA); Bruno Rositano, Richmond Hill (CA); Samantha Gauvreau, Ajax (CA); Tapan Choudhury, Calgary (CA); Troy Pariag, Pickering (CA)

(73) Assignee: International Business Machines Corporation, Armonk, NY (US)

( * ) Notice: Subject to any disclaimer, the term of this patent is extended or adjusted under 35 U.S.C. 154(b) by 246 days.

(21) Appl. No.: 15/892,561

(22) Filed: Feb. 9, 2018

(65) Prior Publication Data
US 2019/0251514 A1   Aug. 15, 2019

(51) Int. Cl.
*G06Q 10/10*   (2012.01)
*G06N 7/00*    (2006.01)
*G06F 16/27*   (2019.01)

(52) U.S. Cl.
CPC ......... *G06Q 10/1053* (2013.01); *G06F 16/27* (2019.01); *G06N 7/005* (2013.01)

(58) Field of Classification Search
CPC ..... G06Q 10/1053; G06N 7/005; G06F 16/27
See application file for complete search history.

(56) References Cited

U.S. PATENT DOCUMENTS 6,574,613 B1 *  6/2003  Moreno-Barragan ...................... G01N 33/0034 706/16
6,738,760 B1    5/2004  Krachman
(Continued)

OTHER PUBLICATIONS

Grönberg, Per-Olof, Fay Lundh Nilsson, and Glenn Sandström. "Desirable skills? Non-Nordic citizens applying for work permits in Sweden, 1947-1950." Labor History 56.4 (2015): 481-498. (Year: 2015).*

(Continued)

*Primary Examiner* — Andrew B Whitaker
*Assistant Examiner* — Brendan S O'Shea
(74) *Attorney, Agent, or Firm* — Schmeiser, Olsen & Watts LLP; Michael A. Petrocelli

(57) ABSTRACT

A prediction system and method may include receiving a plurality of discrete applicant data inputs and a supporting document, the applicant data inputs and the supporting document being relevant to a permit application, providing a first predicted probability of approval of the permit application by comparing the discrete applicant data inputs with weighted criteria of previous applicant profiles stored in a first database, analyzing the supporting document to determine a second predicted probability of approval of the permit application by comparing the supporting document with previous applicant supporting documents stored in a second database, performing a sentiment analysis on external publically available information relevant to at least one aspect of the permit application to determine an impact score on the permit application, and determining an overall probability of success based on the first predicted probability, the second predicted probability, and the impact score.

14 Claims, 8 Drawing Sheets

(56) References Cited

U.S. PATENT DOCUMENTS

| | | | |
|---|---|---|---|
| 2002/0147607 A1 | 10/2002 | Thakur et al. | |
| 2002/0169692 A1 | 11/2002 | Dutta et al. | |
| 2003/0046287 A1 | 3/2003 | Joe | |
| 2007/0294092 A1 | 12/2007 | Calannio | |
| 2008/0027747 A1 | 1/2008 | McGovern et al. | |
| 2009/0313200 A1 | 12/2009 | Petrucelli | |
| 2012/0290524 A1 | 11/2012 | Petrucelli | |
| 2013/0041703 A1 | 2/2013 | Ganji et al. | |
| 2014/0058967 A1 | 2/2014 | Luong | |
| 2014/0304202 A1* | 10/2014 | Shah | G06Q 10/107 706/16 |
| 2017/0262447 A1* | 9/2017 | Paulsen | H04L 67/00 |

OTHER PUBLICATIONS

Singapore Government, "What is the Employment/ S Pass Self-Assessment Tool?" https://services.mom.gov.sg/sat/FAQ.htm [Accessed Jan. 17, 2018]., 2 pages.

K. Shelfer, "Using Competitive Intelligence to Develop an Automated Visa Approval System." In: Monteiro J.L., Swatman P.M.C., Tavares L.V. (eds) Towards the Knowledge Society. IFIP—The International Federation for Information Processing, vol. 105. Springer, Boston, MA, 2003., 15 pages.

D. Cohen, "Express Entry CRS Calculator: Calculate Your Points for Canadian Immigration Express Entry Pool." https://www.canadavisa.com/comprehensive-ranking-score-calculator.html [Accessed Jan. 17, 2018], 3 pages.

D. Cohen, "Express Entry—Comprehensive Ranking System." https://www.canadavisa.com/comprehensive-ranking-system.html [Accessed Jan. 17, 2018], 12 pages.

D. Cohen, "Express Entry: Improving Your Profile And Ranking," https://www.canadavisa.com/express-entry-improving-your-profile-and-ranking.html [Accessed Jan. 17, 2018]., 4 pages.

Canada-Visa-Helpcentre, "How do I increase CRS score?" http://canadavisahelpcentre.com/the-awesome-list-of-faqs/how-do-i-increase-crs-score/ [Accessed Jan. 17, 2018], 4 pages.

R. Spencer, "Frequently Asked Questions about H-1B Temporary Work Status," Borene Law Firm, 2007. https://www.coloradocollege.edu/dotAsset/e2fd1bef-41b1-4f3c-b5b9-1af6166f89cd.pdf, 7 pages.

Hunter College, "Improve Your Chances Of Being Issued A Visa." http://www.hunter.cuny.edu/studentservices/is/visa [Accessed Jan. 17, 2018], 3 pages.

Pickatub, "Calculate your Probability/Chances of getting H1B Visa." http://www.pickatub.com/h1b/ [Accessed Jan. 17, 2018], 9 pages.

Anonymous, "Systematic Analysis and Scoring for Human Resources Candidate Recruitment." IP.com Disclosure No. IPCOM000233528D, Publication Date: Dec. 11, 2013., 5 pages.

U.S. Appl. No. 15/892,762, filed Feb. 9, 2018.

Murphy, Jason A.; List of IBM Patents or Patent Applications Treated as Related; Mar. 30, 2021; 1 page.

Mell, Peter et al.; "The NIST Definition of Cloud Computing;" National Institute of Standards and Technology; Special Publication 800-145; Sep. 2011; 7 pages.

Murphy, Jason A.; List of IBM Patents or Patent Applications Treated as Related; Feb. 22, 2021; 1 page.

K-Johnson, "Visa lawyer bot pledges to 'help immigrants make America great again'." Nov. 14, 2016 https:/12 ilenturebeat.com/2016/11/14/visa-lawyer-bot-pledges-to-help-immigrants-make-america-great-again/ (Accessed—17-2018]. 3 pages.

Beliz Gunel & Onur Mutlu, Predicting the Outcome of H-1 B Visa Applications, Fall 2017, http://cs229.stanford.edu/proj2017/final-reports/520870 1.pdf (Year 2017), 7 pages.

\* cited by examiner

COGNITIVE ASSESSMENT OF PERMIT APPROVAL

TECHNICAL FIELD

The present invention relates to systems and methods for cognitive assessment of work permit application approval, and more specifically the embodiments of a prediction system for predicting an overall probability of success that a work permit application submitted by a candidate will be approved.

BACKGROUND

Many businesses require the skills and expertise of temporary workers from other countries to improve business success and economic growth, and to deliver innovative solutions to clients. In some cases, a work permit application must be completed and approved to allow the temporary worker to work in a host country. Preparing a work permit application requires a significant time investment from the applicant or company seeking temporary work from other countries. For example, preparing a work permit application includes providing an upwards of a hundred or more pages of documents, in addition to securing letters of support from others, preparing resumes, certifications, awards, etc. The contents of the documents often times determines whether or not the work permit application will be granted by a governing authority. Certain content in the work permit application may lead to success with governing authorities and some content may lead to refusal.

Thus, a need exists to cognitively assess the work permit application to determine a likelihood that a work permit application will be granted or refused based on the content of the work permit application, prior to officially submitting the work permit application.

SUMMARY

A first embodiment of the present invention relates to a method for predicting an overall probability of success that a work permit application submitted by a candidate will be approved. A processor of a computing system receives a plurality of discrete applicant data inputs and at least one supporting document, the plurality of discrete applicant data inputs and the at least one supporting document being relevant to the work permit application. A first predicted probability of approval of the work permit application is provided by comparing the plurality of discrete applicant data inputs with weighted criteria of previous applicant profiles stored in a first database. The at least one supporting document is analyzed to determine a second predicted probability of approval of the work permit application by comparing the at least one supporting document with previous applicant supporting documents stored in a second database. A sentiment analysis is performed on external publicly available information relevant to at least one aspect of the work permit application to determine an impact score on the work permit application. An overall probability of success is determined based on the first predicted probability, the second predicted probability, and the impact score.

A second embodiment of the present invention relates to a computer system, including a processor, a memory device coupled to the processor, and a computer readable storage device coupled to the processor, wherein the storage device contains program code executable by the processor via the memory device to implement a method for determining an overall probability of success that a work permit application submitted by a candidate will be approved. The method includes receiving, by a processor of a computing system, a plurality of discrete applicant data inputs and at least one supporting document, the plurality of discrete applicant data inputs and the at least one supporting document being relevant to the work permit application. A first predicted probability of approval of the work permit application is provided by comparing the plurality of discrete applicant data inputs with weighted criteria of previous applicant profiles stored in a first database. The at least one supporting document is analyzed to determine a second predicted probability of approval of the work permit application by comparing the at least one supporting document with previous applicant supporting documents stored in a second database. A sentiment analysis is performed on external publicly available information relevant to at least one aspect of the work permit application to determine an impact score on the work permit application. An overall probability of success is determined based on the first predicted probability, the second predicted probability, and the impact score.

A third embodiment of the present invention relates to a computer program product having a computer readable hardware storage device storing a computer readable program code, the computer readable program code comprising an algorithm that when executed by a computer processor of a computing system implements a method for determining an overall probability of success that a work permit application submitted by a candidate will be approved. The method includes receiving, by a processor of a computing system, a plurality of discrete applicant data inputs and at least one supporting document, the plurality of discrete applicant data inputs and the at least one supporting document being relevant to the work permit application. A first predicted probability of approval of the work permit application is provided by comparing the plurality of discrete applicant data inputs with weighted criteria of previous applicant profiles stored in a first database. The at least one supporting document is analyzed to determine a second predicted probability of approval of the work permit application by comparing the at least one supporting document with previous applicant supporting documents stored in a second database. A sentiment analysis is performed on external publicly available information relevant to at least one aspect of the work permit application to determine an impact score on the work permit application. An overall probability of success is determined based on the first predicted probability, the second predicted probability, and the impact score.

In preferred aspects of the present invention, the weighted criteria of the previous applicant profiles is weighted based on: (i) a historical data of outcomes of previous work permit applications submitted by previous applicants in various countries, (ii) an internal training data and relevant data sets for individual countries, (iii) an external training data and relevant data sets for individual countries, and (iv) human resource records from a home country and a host country for each previous applicant.

In preferred aspects of the present invention, the weighting criteria is determined by training the previous applicant profile data using a statistical model and a machine learning model using neural networks, to extract patterns and relationships in previously submitted work permit applications to determine an importance of a given criteria of the previously submitted work permit application. The statistical model is used for classifying previously submitted work permit applications as approved or denied based on a hierarchal combination of variables from the previously submitted work permit applications. The machine learning model using neural networks is used for inferring and updating rules to be used for determining the importance of the given criteria of the previously submitted work permit application.

In preferred aspects of the present invention, training data stored on the second database includes previous applicant supporting documents that accompanied previously submitted work permit applications. The training data, such as the previous application supporting documents, are processed by a natural language understanding application to output a list of keywords for each supporting document with a relevance score for each keyword. The keywords are aggregated.

In preferred aspects of the present invention, natural language processing is used to determine keywords and associated relevance scores of the keywords of the at least one supporting document. The keywords are then compared with aggregated keywords and relevance scores of the previous application supporting documents stored in the second database to determine the second predicted probability of approval of the work permit application.

DETAILED DESCRIPTION

Work permit applications require effort to prepare the paperwork and can be very costly in terms of time of the employers and applicants and dollars for in house and/or vendor based immigration services, as an example. In many situations employers or employers' clients or customers are operating under contractual obligations. Not knowing if a work permit application will be approved by immigration authorities can lead to costly delays, penalties due to service level agreements not being met, loss of current and future business and client confidence. Thus, there is a need for a prediction system for predicting an overall probability of success that a work permit application submitted by a candidate will be approved.

Embodiments of the present invention may leverage multiple data sources on a real-time basis to establish a probability of success of a work permit application. Embodiments of the present invention may utilize several weighted data elements in an assessment, to determine a likelihood that the work permit application package will be granted. Furthermore, extensive datasets containing resource supporting documents (e.g. resumes, letters of support, and application documents) may be used to compare key country-specific criteria set by immigration authorities in various countries to produce a prediction of a probability of approval. In addition, given that a current global, social, political, and economic climate could impact a country's priorities and immigration legislation, external trends from news feeds and other external publically available information, such as publications by the government, industry and social media, may be used to perform a real time sentiment analysis and learn insights that may impact a likelihood that a work permit application will be granted, at that particular time. The results from the above analysis may be triangulated into an algorithm to produce an overall final probability assessment with the highest degree of accuracy and confidence. Accordingly, embodiments of the present invention may leveraging the power of cognitive analysis of internal and external data and information sources, to provide a real-time probability of approval success for work permit applications. In an exemplary embodiment, a computing system may work in concert with cognitive computing and machine learning algorithms and APIs to leverage internal and external information sources, carefully curated datasets of highly relevant historical data, and current immigration legislation policies and insights gathered by a team of subject matter experts.

Figure 1:
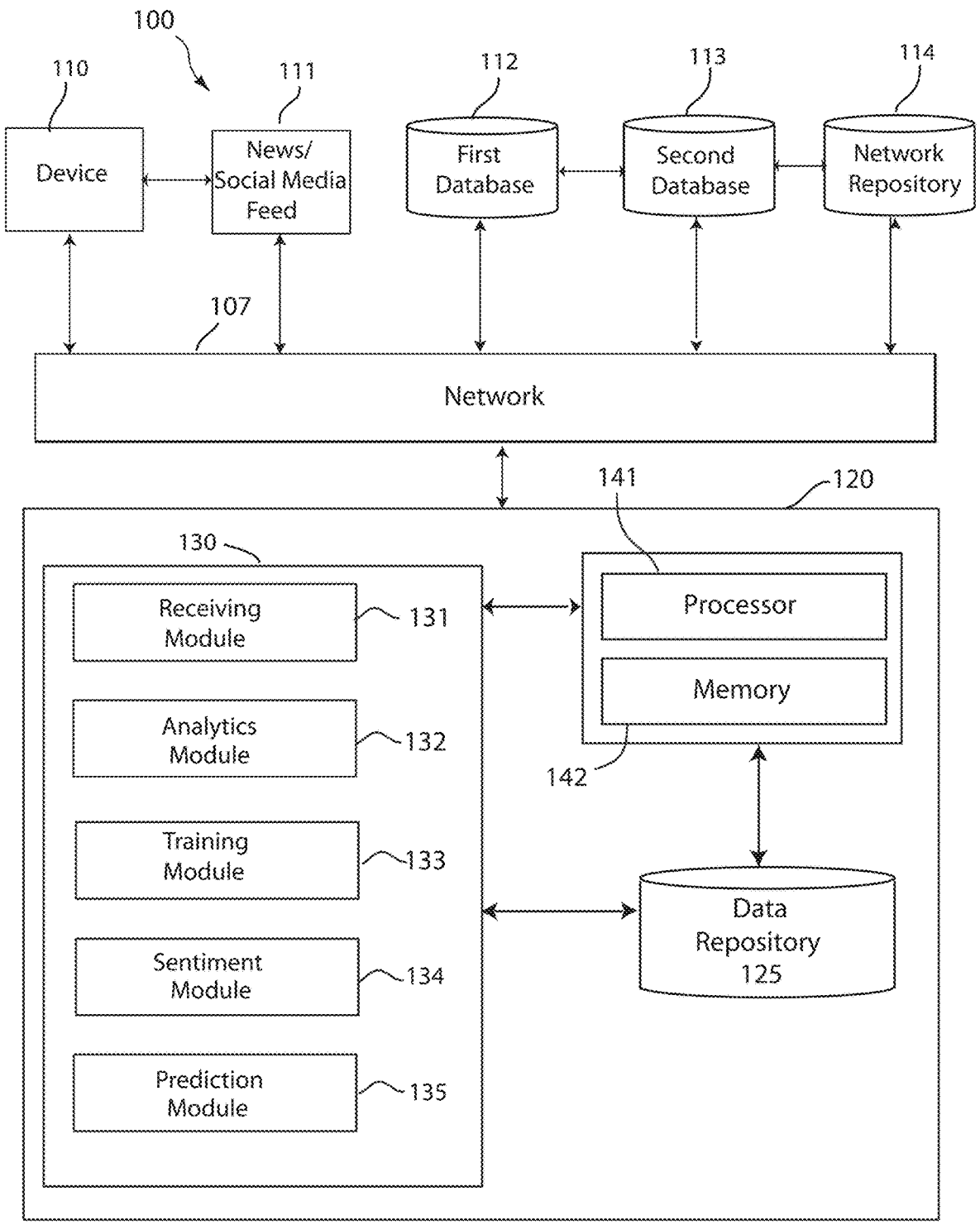
FIG. 1 depicts a block diagram of a prediction system, in accordance with embodiments of the present invention.

Referring to the drawings, FIG. 1 depicts a block diagram of prediction system 100, in accordance with embodiments of the present invention. Embodiments of the prediction system 100 may be a system for determining an overall probability of success that a work permit application submitted by a candidate will be approved. Embodiments of the prediction system 100 may be useful for companies and individuals submitting a work permit application. For example, the prediction system 100 may utilize cognitive analysis of internal and external data and information sources to provide a real-time probability of approval success for employer-based work permit applications. A work permit application may be an application for a non-citizen of a host country to temporarily work in the host country. Work permit applications may be in many forms and may vary from host country to host country. Many work permit applications contain several pages to over 100 pages of information, including supporting documents.

Embodiments of the prediction system 100 may be an approval determination system, a work permit application analyzer, a data analytics tool for predicting a likelihood of success of a work permit application, a recommendation system for recommending whether an entity should file a work permit application, a recommendation system, a work permit application prediction system, and the like. Embodiments of the prediction system 100 may include a computing system 120. Embodiments of the computing system 120 may be a computer system, a computer, a server, one or more servers, and the like.

Furthermore, embodiments of prediction system 100 may include a device 110, a social media/news feed 111, a first database 112, and a second database 113, that are communicatively coupled to a computing system 120 of the prediction system 100 over a computer network 107. For instance, information/data may be transmitted to and/or received from the device 110, the social media/news feed 111, the first database 112, and the second database 113 over a network 107. A network 107 may be the cloud. Further embodiments of network 107 may refer to a group of two or more computer systems linked together. Network 107 may be any type of computer network known by individuals skilled in the art. Examples of network 107 may include a LAN, WAN, campus area networks (CAN), home area networks (HAN), metropolitan area networks (MAN), an enterprise network, cloud computing network (either physical or virtual) e.g. the Internet, a cellular communication network such as GSM or CDMA network or a mobile communications data network. The architecture of the network 107 may be a peer-to-peer network in some embodiments, wherein in other embodiments, the network 107 may be organized as a client/server architecture.

In some embodiments, the network 107 may further comprise, in addition to the computing system 120, a connection to one or more network-accessible knowledge bases 114, which are network repositories containing information of the user, applicant for work permit application, company, network repositories or other systems connected to the network 107 that may be considered nodes of the network 107. In some embodiments, where the computing system 120 or network repositories allocate resources to be used by the other nodes of the computer network 107, the computing system 120 and network-accessible knowledge bases 114 may be referred to as servers.

The network-accessible knowledge bases 114 may be a data collection area on the computer network 107 which may back up and save all the data transmitted back and forth between the nodes of the computer network 107. For example, the network repository may be a data center saving and cataloging applicant data, company data, application submission data, and the like, to generate both historical and predictive reports regarding a particular user or work permit application, and the like. In some embodiments, a data collection center housing the network-accessible knowledge bases 114 may include an analytic module capable of analyzing each piece of data being stored by the network-accessible knowledge bases 114. Further, the computing system 120 may be integrated with or as a part of the data collection center housing the network-accessible knowledge bases 114. In some alternative embodiments, the network-accessible knowledge bases 114 may be a local repository that is connected to the computing system 120.

Embodiments of the device 110 may be a user or applicant or company device, a cell phone, a smartphone, a user mobile device, a mobile computer, a tablet computer, a PDA, a dedicated mobile device, a desktop computer, a laptop computer, or other internet accessible device, machine, or hardware computing devices that may interact with computing system over a network 107 to enter data inputs or otherwise fill out a work permit application for analysis by the computing system 120. The device 110 may be used to transmit, initiate, create, send, etc. (e.g. over a network) a discrete data inputs and supporting documents to computing system 120, for prediction analysis of a work permit application, prior to actual submission of the work permit application. Embodiments of the device 110 may connect to the computing system 120 over network 107. The device 110 may be running one or more software applications associated with the a work permit application simulation, such as a work permit application communicating with computing system 120.

Referring still to FIG. 1, embodiments of the prediction system 100 may include a social media/news feed 111. Embodiments of the social media/news feed 111 may be communicatively coupled to the computing system 120 over computer network 107. Embodiments of the social media/news feed 111 of the prediction system 100 depicted in FIG. 1 may be one or more social media platforms, social networking websites, document collaboration and sharing platforms, news websites, government agency websites, immigration blogs, immigration agency websites and social media pages, and the like. Moreover, embodiments of social media/news feed 111 may be one or more websites, applications, databases, storage devices, repositories, servers, computers, engines, and the like, that may service, run, store or otherwise contain information and/or data regarding immigration news, policies, laws, updates, social media perceptions, trends, and the like. The social media/news feed 111 may be accessed or may share a communication link over network 107, and may be managed and/or controlled by a third party, such as a social network or social media company, a government agency, a news agency, a corporation, and the like. In an exemplary embodiment, the social media/news feed 111 may be a social media network, social media website, social media engine, news website, official government publications website, and the like, which may store, release, or otherwise contain content an information related to a work permit application, such as a country's policy, law, new releases, public perception from citizens, and the like.

Furthermore, embodiments of the computing system 120 may be equipped with a memory device 142 which may store various data/information/code, and a processor 141 for implementing the tasks associated with the prediction system 100. In some embodiments, a prediction application 130 may be loaded in the memory device 142 of the computing system 120. The computing system 120 may further include an operating system, which can be a computer program for controlling an operation of the computing system 120, wherein applications loaded onto the computing system 120 may run on top of the operating system to provide various functions. Furthermore, embodiments of computing system 120 may include the prediction application 130. Embodiments of the prediction application 130 may be an interface, an application, a program, a module, or a combination of modules. In an exemplary embodiment, the prediction application 130 may be a software application running on one or more back end servers, servicing device 110.

The prediction application 130 of the computing system 120 may include a receiving module 131, an analytics module 132, a training module 133, a sentiment module 134, and a prediction module 135. A "module" may refer to a hardware-based module, software-based module or a module may be a combination of hardware and software. Embodiments of hardware-based modules may include self-contained components such as chipsets, specialized circuitry and one or more memory devices, while a software-based module may be part of a program code or linked to the program code containing specific programmed instructions, which may be loaded in the memory device of the computing system 120. A module (whether hardware, software, or a combination thereof) may be designed to implement or execute one or more particular functions or routines.

Embodiments of the receiving module 131 may include one or more components of hardware and/or software program code for receiving a plurality of discrete applicant data inputs and at least one supporting document that are relevant to a work permit application. In an exemplary embodiment, the receiving module 131 may receive and/or process the applicant data inputs and/or supporting documents to create/generate an applicant profile, for analysis by the prediction application 130. Embodiments of applicant discrete data inputs may include, but not limited to, an employee job role, an experience level, an entity hiring the candidate, a host country, a home country, a salary information, a name, a work location, a prior assignment, a skill set, a date and time of the submission, and a duration of stay in the host country, etc. Embodiments of a supporting document may include a document having text that is submitted in support of an applicant's work permit application. Examples of a supporting document may include a resume, a letter of support, certification letters, letters of recommendation, essays, written statements in support of the application and the like. The applicant discrete data inputs may be entered by interfacing with device 110, which may transmit or upload the data and the supporting document(s) to the receiving module 131 of the computing system 120. The applicant data may be entered using an application running on the device 110, serviced by the computing system 120. The application may include one or more fields of information relating to a particular discrete data input so the applicant can conveniently enter information for processing by the computing system 120.

Referring again to FIG. 1, embodiments of the computing system 120 may further include an analytics module 132. Embodiments of the analytics module 132 may include one or more components of hardware and/or software program for providing a first predicted probability of approval of the work permit application by comparing the plurality of discrete applicant data inputs with weighted criteria of previous applicant profiles stored in a first database 112. For instance, embodiments of the analytics module 132 may analyze the discrete data inputs associated with a work permit application to obtain a prediction of a likelihood of approval of the work permit application based on the applicant discrete data inputs. The discrete data inputs input by the applicant may be compared with a weighted criteria of similar or identical data input fields, based on knowledge of previous applicant profiles stored in the first database 112.

Embodiments of the computing system 120 may include a training module 133. Embodiments of the training module 133 may include one or more components of hardware and/or software program for creating, establishing, updating, and maintaining the first database 112 and the second database 112. The training module 132 may curate the first database 112 to allow a weighted criteria to be determined. Further, embodiments of the training module 133 may utilize a training phase where a predictive model can be trained on sets of individual applicant profiles and respective outcomes of the previous applications, to extract important patterns and relationships in the data that help to predict future outcomes, and a testing phase where the accuracy of these extracted patterns and relationships can be tested on a new set of individual applicant profiles.

The first database 112 may contain training data that has been gathered, configured, and curated from a plurality of sources, and organized into a plurality of previous application profiles, by the training module 133 of the computing system 120. The training data stored in the first database 112 comprising previous application profiles may be a basis on which the weighting criteria is based. For example, the weighted criteria of the previous applicant profiles may be weighted based on a historical data of outcomes of previous work permit applications submitted by previous applicants in various countries, an internal training data and relevant data sets for individual countries, an external training data and relevant data sets for individual countries, and human resource records from a home country and a host country for each previous applicant. For privacy and security reasons, training data of the previous applicant profiles related to identity of the previous applicant may be masked and/or tokenized.

An exemplary list of training data (e.g. internal training data) may include:
1. DIVISION:
2. SECTOR:
3. CLIENT NAME:
4. HOME COUNTRY:
   Candidate Information—Deliver Country
   Country High Commission Report—Country
   Active Landings/Separated Landings/Future Landings—Country
   Application Letter of Support—Introductory/Summary Sections
   Application Cover Letter—Introductory/Summary Sections
5. WORK LOCATION
   Candidate Information—Landed City
   Country High Commission Report—City
   Active Landings/Separated Landings/Future Landings—Landed City
   Application Cover Letter—Summary Section
   Country High Commission Report—Province
   Application Cover Letter—Summary Section
6. INITIATION DATE:
   Landed Exception Request Form—Request Status Date
   Country High Commission Report—Initiation Date
   Country High Commission—Submission Date:
   Country High Commission Report—Submission Date
   Application Letter of Support—Date on letter
   Application Cover Letter—Date on letter
7. PRIOR ASSIGNMENT: YES/NO:
   Country High Commission Report—Returning Employee
   Profession Level/Experience Level (P/E)
   Landed Exception Request Form—P/E
   Country High Commission Report—P/E
   Active Landings/Separated Landings/Future Landings—P/E
   HR Inputs—P/E Information
8. NATIONAL OCCUPATION CODE (NOC):
   Country High Commission Report—NOC
   Application Letter of Support—Summary Section
   Application Cover Letter—Summary Section
9. JOB ROLE:
   Landed Exception Request Form—Job Role Skill Set
   Candidate Information—Job Role Skill Set
   Country High Commission Report—Job Role Skill Set
   Application Letter of Support—Summary Section
   Application Cover Letter—Summary Section
10. SKILL SET:
    Landed Exception Request Form
    Candidate Information—Job Role Skill Set
    Country High Commission Report—Job Role Skill Set
    Application Letter of Support—Summary Section
    Application Cover Letter—Summary Section
11. ROLE CLASSIFICATION:
    Job Role Skill Set Short List 12. WORK PERMIT DURATION:
   Assignment Duration (months)
   Landed Duration (mth)
   Active Landings/Separated Landings/Future Landings—Duration
   Application Letter of Support—Summary Section
   Application Cover Letter—Summary Section
13. DATE HIRED BY COMPANY:
   Landed Exception Request Form—Date joined Company
   Country High Commission Report—DOJ
   Resume—Work History or Profile Summary
   Citizenship And Immigration Application for Work Permit Made Outside of Country Form—Employment Section
14. YEARS OF COMPANY SERVICE:
   Landed Exception Request Form—Years of IBM Service
   Country High Commission Report—Company Years of Service
   Resume—Calculated from Work History or Profile Summary
   Application Letter of Support—Introductory/Applicant Sections
15. ADJUDICATION STATUS:
   Country High Commission Report—Status
   Access to Information and Privacy
16. DATE ADJUDICATED:
   Country High Commission Report—VISA Approved/Rejected Date
17. LANDED BASE SALARY:
   Country High Commission Report—Base Salary (Annual)
18. ON POST TEMPORARY ASSIGNMENT ALLOWANCE:
   Country High Commission Report—Annual Allowance total
19. COUNTRY SALARY:
   Country High Commission Report—Base+Annual Allowances
   Sum of BASE SALARY+Annual Allowances
20. PREVAILING WAGE (PW) FOR ROLE AND LOCATION:
   Country High Commission Report—Prevailing Wage (Annual)
21. PREVAILING WAGE (PW) SALARY VARIANCE:
   Country High Commission Report—Difference (Base+Allowances−Prevailing Wage annual)
22. COUNTRY BASE SALARY (LOCAL CURRENCY):
   Salary before any bonuses or other economic benefits are added
   Sources used for Country Base Salary:
   1. "Data from Country" in Company Adjudication Data
   2. Country High Commission Salary Assessment
   3. Country High Commission Case Assessment
23. HOME COUNTRY ANNUAL REMUNERATION (IN HOME CURRENCY):
   Payment or compensation received for services or employment. This includes base salary and any bonuses or other economic benefits that an employee or executive receives during employment
   Sources used for Annual Remuneration:
   1. Gross Salary from Salary Payslip
   2. Country High Commission Salary Assessment
   3. Active Inactive BTL V1
   4. Calculated from base salary
24. COMPANY PERCENTAGE MARKET REFERENCE (PMR %):
   Performance measurement and reporting
   Sources used for Percentage Market Reference %:
   1. Country High Commission Salary Assessment
   2. "Data from Home Country" from Adjudication Data
   3. Country High Commission Case Assessment
   4. Active Inactive
25. ESTIMATED INDUSTRY AVERAGE SALARY:
   STEP 1: Establish Job Role (Example: Application Developer—JAVA) on Home Country Salary Site.
   STEP 2: Search for a section on the web page called "Experience Affects Applications Engineer Salaries" and it contains the national average for the job role: Application Developer
   STEP 3: When searching for an average salary for the specified skill, like JAVA, we may find it in the segment "Popular Skills for application developer"
   STEP 4: Underneath this section you can find "pay difference by location" in which the variances (percent variation) for locations are displayed as well as local median average salary for this role
   These steps allow you to determine both mean and median industry average salaries for a specific location
   STEP 5: Job Role Skill Set—job role-salary by location for a list averagenational and local salaries of Job Role Skill Set
26. ESTIMATED INDUSTRY JOB ROLE:
   Enter the matching role considering the employees skill level, title, salary, and working experience.
27. YEARS OF IT EXPERIENCE:
   Application Letter of Support—Applicant Section
   Application Cover Letter—Applicant Section
   Resume
28. PRIOR YEAR GROSS TOTAL INCOME FROM INCOME TAX (HOME COUNTRY CURRENCY):
   Income Tax Return Form in Application—Gross Total Income
   Source examples for Income Tax Returns:
   1. Home Country Income Tax Acknowledgement
   2. Income Tax Return Verification Form
   3. Centralized Processing Center Income Tax Department
   4. Reconciliation Analysis and Correction Enabling System,
   5. Home Country Income Tax Return
29. COUNTRY HIGH COMMISSION OFFICE OF ADJUDICATION:
   Access to Information and Privacy
   Company Records
30. HOME COUNTRY COMPANY OFFICE LOCATION CITY:
   Candidate Information—Employee Location
   Application Letter of Support—Introductory Section
   Application Cover Letter—Introductory Section
   Country Citizenship and Immigration Application for Work Permit
   Made Outside of Country Form—Employment Section
   Company Questionnaire—Current Employer Address
31. DATE OF BIRTH:
   Application Letter of Support—Summary Section
   Application Cover Letter—Summary Section
   Passport photocopy in Application
   Host Country Citizenship and Immigration Application for Work Permit Made Outside of Country Form—Personal Details—Date of Birth Host Country Citizenship and Immigration Family Information Form in Application—Date of Birth
Company Questionnaire Tab—Date of Birth
32. MARITAL STATUS:
Company documents—Looking for a marriage certificate
Marriage Certification in Application
Host Country Citizenship and Immigration Family Information Form in Application—Spouse or Common-Law Partner
Host Country Citizenship and Immigration Application for Work Permit Made Outside of Country Form—Current marital status
Company Questionnaire Tab—Listing spouse and children in Questionnaire
33. FAMILY STRUCTURE:
Host Country Citizenship and Immigration Family Information Form in Application—Section C Brothers and Sisters
34. HIGHEST EDUCATION DEGREE:
Application Letter of Support by Company—Applicant Section
Resume—Education Section
Education documents in Application
Company Questionnaire—Educational Background
Host Country Citizenship and Immigration Application for Work Permit Made Outside of Country Form—Education Section
35. FIELD OF STUDY:
Education documents in Application
Company Questionnaire—Educational Background
Host Country Citizenship and Immigration Application for Work Permit Made Outside of Country Form—Education Section The above training data may be used to generate a weighting criteria by the training module 133, which may then be used by the analytics module 132 for determining a first prediction of success based on the new application's discrete applicant data inputs. In an exemplary embodiment, the weighting criteria may be determined by training the previous applicant profile data (e.g. including the listed data points) using a statistical model and a machine learning model using neural networks, to extract patterns and relationships in previously submitted work permit applications to determine an importance of a given criteria of the previously submitted work permit application. The two models may be used to train the data that was previously curated in the first database 112 (and potentially the second database 113).

The statistical model may be used for classifying previously submitted work permit applications as approved or denied based on a hierarchal combination of variables from the previously submitted work permit applications. Embodiments of the statistical model may use a CHAID (Chi-square Automatic Interaction Detector) decision tree. A decision tree may classify previously submitted applicant profiles as approved or refused based on a hierarchical combination of variables from the applicant profile and/or previously submitted applicant work permit application. The statistical model applied to the data stored in the first database 112 may assist the analytics module 132 in obtaining a preliminary prediction based on a select group of variables that contribute most significantly to the outcome. Further, the decision tree model may remain accurate and valid even when patterns and relationships between variables in a applicant/candidate profiles are complex and nonlinear.

The machine learning model using neural networks used for inferring and updating rules to be used for determining the importance of the given criteria of the previously submitted work permit application. Neural networks can be composed of processing elements, referred to as nodes, which can be organized into layers where the output of every layer may become the input for the next layer. The first layer of nodes may receive inputs from the training dataset, accumulate the information, and make an output computation which can be sent to the next layer of nodes. The process can be repeated until reaching the final output layer at which point the model infers rules for making predictions about the success of an applicant profile. Embodiments of the machine learning model can learn during the training. After giving an output, the neural network may compare results to a true outcome and start adjusting computations to produce a more accurate prediction, which can be repeated for many iterations until an acceptable level of predication accuracy is achieved. Moreover, neural network performance can improve with more comprehensive datasets because the algorithm identifies all important relationships between the variables in the applicant profile. The neural network model applied to the data stored in the first database 112 (and potentially the data stored in second database 113) remains accurate and valid even when patterns and relationships between variables in a candidate profile are complex and nonlinear. Whenever there are updates to internal and/or external data, in order to achieve the most accurate outcome, both the machine learning and statistical models may need to be re-trained with the new or updated data components within the updated training dataset coming from additional, newly submitted work permit applications from new applicant.

An output of these the statistical model and the machine learning model with neural networks may be aggregated with a weighting to generate the weighting criteria used by the analytics module 132 during comparison of the discrete applicant data and the previous applicant profile data in the first database 112. The analytics module 132 may utilize the weighting criteria to give a first prediction of the success of the work permit application, which can be based on both the most significant variables in the previous applicant profiles with the statistical model, while also taking into account subtle impacts from the previous applicant's entire profile achieved with the machine learning model. Further, at each stage the weight/contribution of the two models may be adjusted based completeness of the profile to maximize prediction accuracy.

Accordingly, the analytics module 132 may analyze each discrete applicant data input and determine a score or weight for each discrete data input or field, based on the weighted criteria described above. The weight or score for each data input may be a positive or negative value depending on whether the particular discrete applicant data input harms or improves a chance for approval. The weighting criteria may be used as a guideline for attributing a weight or score to the applicant discrete data point. As an example, the analytics module 132 may compare the following discrete data inputs with similar data inputs from the previous applicant profiles stored in the first database 112: an applicant who is a citizen of country X (e.g. home country +4) applying to country Y (e.g. host country +2) seeking a salary less than industry average in the host country (−3) to perform job Y (+6) with Z years of experience (−1). A sum of the weights or scores may be calculated by the analytics module 132 to determine a total score pertaining to the applicant's data inputs into the work permit application software serviced by the computing system. A total score may be used to calculate a percentage probability of success, which amounts to the first prediction of approval of the work permit application determined by the computing system 120.

Referring still to FIG. 1, embodiments of analytics module 132 may include one or more components of hardware and/or software program code for analyzing at least one supporting document to determine a second predicted probability of approval of the work permit application by comparing the at least one supporting document with previous applicant supporting documents stored in a second database 113. For instance, the analytics module 132 may access the second database 113 to analyze the data stored in the second database 113 to perform a comparison of the supporting document submitted as part of the application with supporting documents filed by previous applicants.

The second database 113 may be curated by the training module 133. Training data comprising previously submitted supporting documents submitted by previous applicants may be stored in the second database 113. In an exemplary embodiment, an applicant's resume and Letter of Support documents (.doc, .docx, and/or .pdf format) previously approved or refused may be sent to a natural language understanding application. An output of the natural language processing may be lists of keywords for each supporting document with a relevance score for each keyword in relation to the overall subject matter of the supporting document. The training supporting document keyword outputs can be aggregated on a high level based on specific data fields associated with the applicant. For example, the outputted keywords can be aggregated on a high level based on an applicant's job role, salary requested, skill set, years of experience, location of workplace, company, etc., and more specifically based on a combination of specific data inputs to create applicant supporting document profiles. The aggregation of training supporting documents may be performed by concatenating all the relevant keywords from all supporting documents with the same specific data fields/inputs. Relevance scores may be combined for keywords that appear multiple times across the supporting documents for the same specific data inputs. A number of supporting documents aggregated for a specific data input combination (e.g. job role/skill set) may be tracked to provide an indication of whether many similar applications have been approved or refused in the past. Each aggregated previous applicant supporting documents profile may be stored in the second database 113, with a unique key being the specific data input combination (e.g. job role/skill set profile) and a type of applicant supporting document, such as a resume or letter of support (e.g. application developer-resume).

The analytics module 132, when analyzing a new supporting document by comparing against the existing repository of previous applicant supporting documents profiles, a text of the newly received supporting document (e.g. from a user operating device 110) may first be analyzed by the natural language understanding application to get a list of keywords and relevance scores, similarly to the previously submitted supporting documents. Specific data inputs/fields of the newly received supporting document (e.g. job role and skill set) may be compared to corresponding specific data inputs/fields (e.g. job role and skill set) of the previous applicant supporting documents profiles stored in the second database 113. The comparison may result in an output, which may be based on one or more algorithms. In an exemplary embodiment, the output for each comparison is based on the following algorithm: (i) create a set based upon all keywords from both the new document and the profile (set means no duplicates, i.e., union), (ii) for each keyword in the set: get a relevance score from both the new supporting document and the previous applicant supporting document profile, and in the profile, divide the score by the number of docs that made up the profile as defined above (if it doesn't exist in the doc or profile, return 0), (iii) subtract the previous applicant supporting document profile score from the new supporting document score (e.g. scoreDiff), (iv) get 1 minus the scoreDiff so a higher difference will result in a smaller number), which may be referred to as an increment, (v) add up the increments for all keywords in the set, and (vi) normalize this sum by dividing by the number of items in the set (will give a score out of 1). The output may then be characterized as follows: If the scoreDiff is greater than 0.5, then add this keyword to the list of "too many references," and if the scoreDiff is less than −0.5, then add this keyword to the list of "too few references."

Accordingly, the analytics module 132 may determine a second prediction of a likelihood of approval based on the comparison between the newly received supporting document(s) and the previously submitted documents stored in the second database 113. The second prediction may be based on the supporting documents alone, and not the applicant discrete data inputs analyzed as described above. To further add to the second prediction accuracy, the supporting documents (e.g. if more than one submitted) may be compared against each other for consistency in key skill, work experience, proprietary skill and specialized knowledge skills key words across the two supporting documents. The results of the document comparison may be displayed for the end user based on the above and a probability is explained to the end user complete with insights into improvements that could be made to increase the success probability.

Referring still to FIG. 1, embodiments of the computing system 120 may include a sentiment module 134. Embodiments of the sentiment module 134 may include one or more components of hardware and/or software program for performing a sentiment analysis on external publically available information relevant to at least one aspect of the work permit application to determine an impact score on the work permit application. External publicly available information may include news, releases, publications, social media posts, official government agency publication, reports, blogs, and the like. The external public information may relate to work permit applications, immigration, public perception regarding work permits, news about a specific country, a new law impacting the work permit process, and the like. Embodiments of the sentiment module 134 may analyze, parse, scan, review, etc. a publicly available content and activity on one or more social media/news feed 111. The analyzing may be performed to determine that a content on the social media/news fees 111 is relevant or otherwise correlates to work permit applications and topics that are relevant thereto. The content shared, uploaded, or otherwise posted on one or more social media/news feeds 111 may be photographs, videos, comments, new laws, reports, news stories, court decisions, media stories, updates, press releases, and the like, made available on one or more social media/news feeds 111. The content may be analyzed, parsed, scanned, searched, inspected, etc. for a context that correlates or otherwise relates to or is associated with work permit applications, host countries, home countries, and the like. In an exemplary embodiment, the sentiment module 134 may utilize a natural language technique to determine keywords associated with the content available on the social media/news feeds 111, and then examine the determined keywords with keywords that may be relatable with content encompassed by work permit applications and similar material. In another exemplary embodiment, the sentiment module 134 may utilize an image or visual recognition engine to inspect, parse, scan, analyze, etc. a photograph, image, video, or other content to determine one or more descriptions or insights that describe or are associated with the photograph, image, video, or other content, and then examine the descriptions/insights with keywords that may be relatable with the content encompassed by work permit application and similar material. In yet another embodiment, the sentiment module 134 may use a combination of natural language techniques, cognitive applications/engines, and visual recognition engines to determine a context, content, and relevancy of the shared content available on the one or more social media and/or news platforms for comparison with the content and/or subjects associated with an approval or refusal of potential newly filed work permit applications.

Moreover, embodiments of the sentiment module 134 may also compare the determined context and content from the news feeds with the content of the work permit application received by the receiving module 131. For instance, keywords, texts, insights, or other acquired computer readable information associated with the analyzed news/social media content may be compared with keywords, texts, insights, or other computer readable information associated with the content of the prospective work permit application, including the applicant discrete data inputs and supporting documents. Based on the comparison, the sentiment module 134 may determine that the content of a particular social network content, news story, blog, official government agency release, etc. may be relevant, correlate or otherwise impact an acceptance level of the work permit application.

Figure 2:
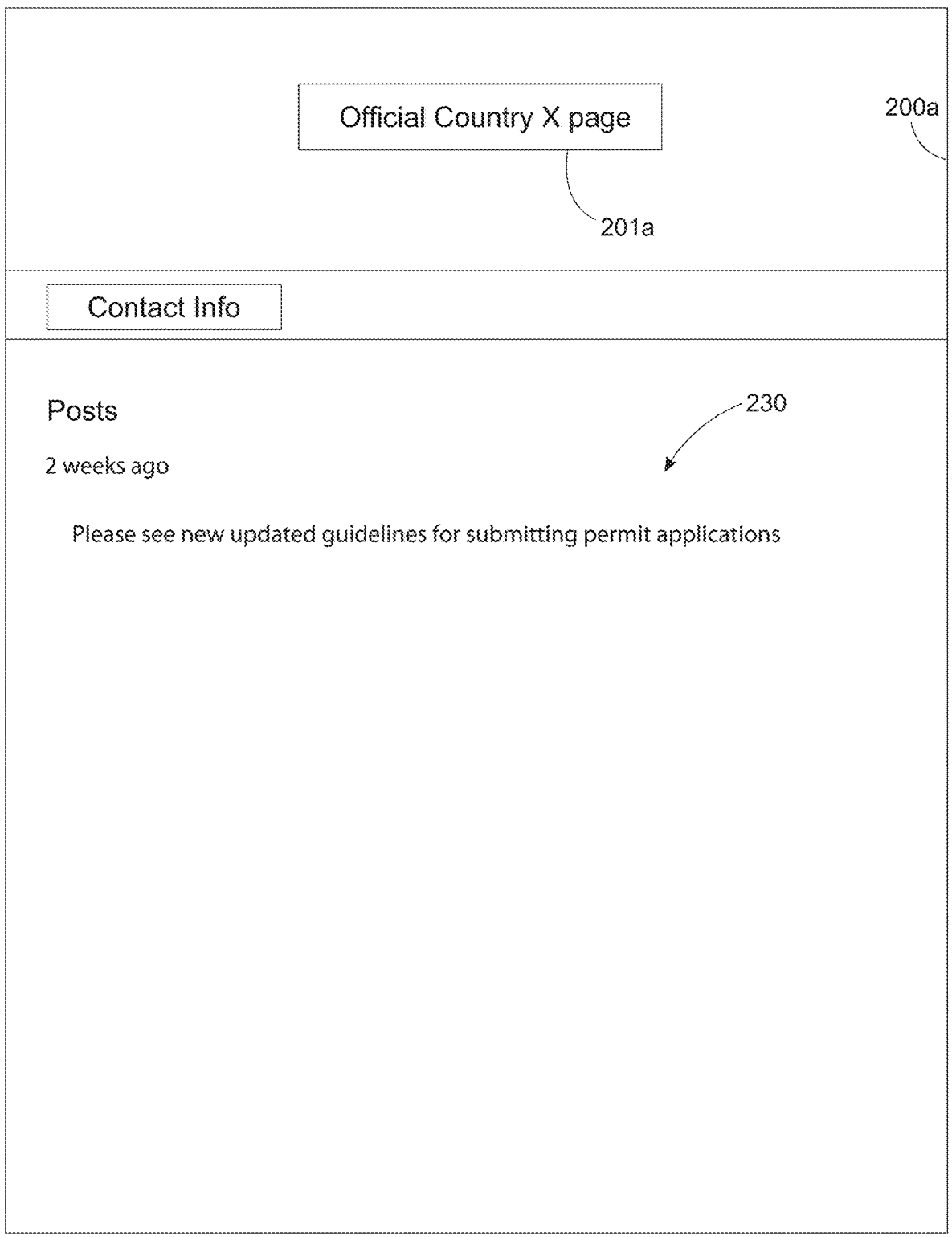
FIG. 2 depicts an exemplary news feed from an official government agency page of a country, containing publicly available information/content, in accordance with embodiments of the present invention.
Figure 3:
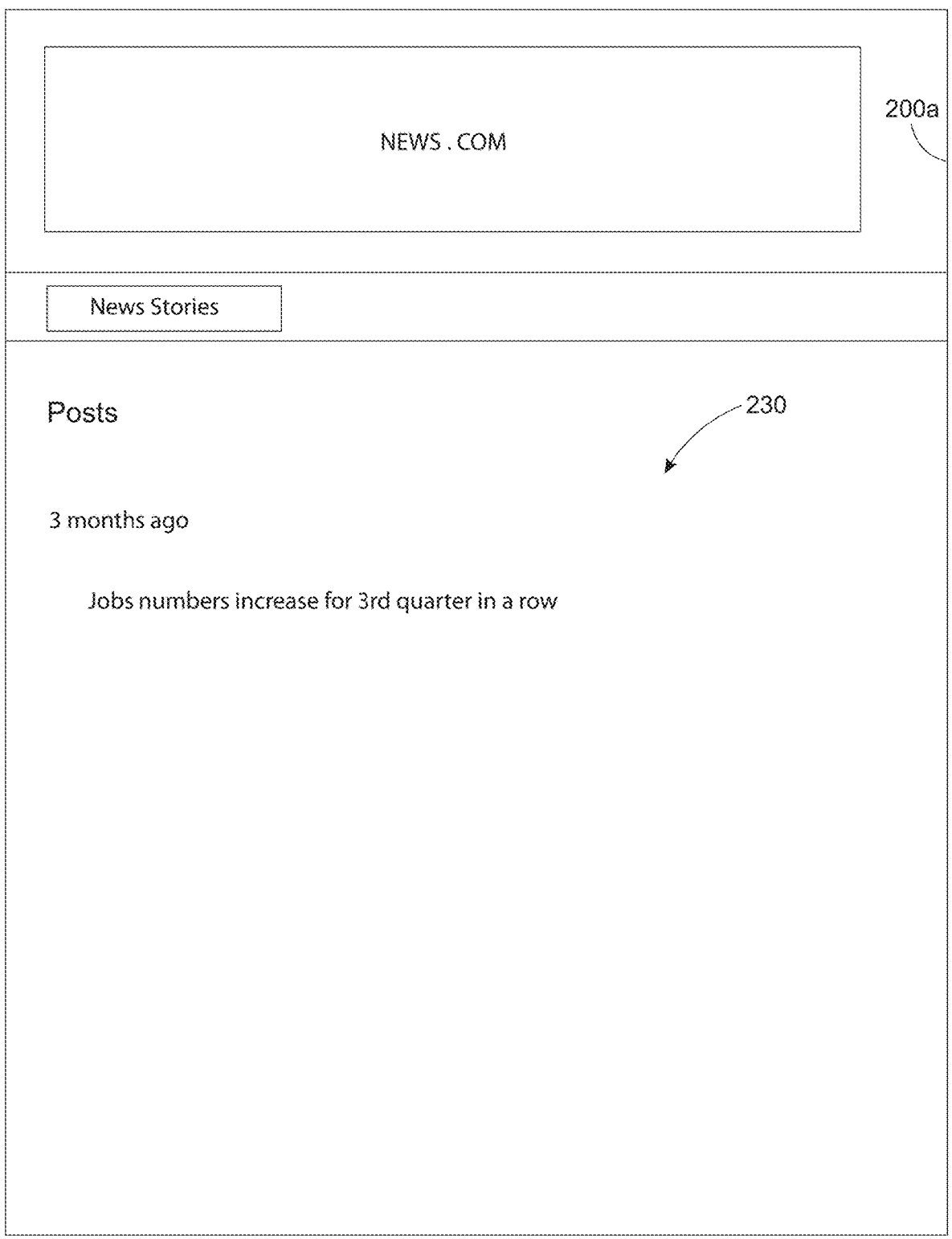
FIG. 3 depicts an exemplary news agency page of a news agency, containing shared content, in accordance with embodiments of the present invention.

Turning now to FIG. 3 for an example of analyzing a social media/news feed 111 (e.g. posts, shared content, laws, etc.) on one or more platforms 111 to determine that the content of on one or more platforms 111 is relevant to the work permit/VISA application. FIG. 2 depicts an exemplary news feed from an official government agency page 200 of a country 201, containing publicly available information/content 230, in accordance with embodiments of the present invention. The page 200 may include a name or identity 201 of the government agency and/or country. The sentiment module 134 may analyze the page 200 to determine whether the page 200 contains any content or activity that may be relevant to the work permit application process. Here, the shared content on the page 200 includes content 230. Embodiments of the sentiment module 134 may analyze content 230 posted by the official government agency of Country Y on page 200. In the comments, the agency has posted text relating to "updated," "guidelines," "work permit applications," and "new." These keywords may be associated with a context of a work permit application process.

Furthermore, embodiments of the sentiment module 134 may perform a sentiment analysis and/or a personality analysis to the content on page 200 to determine a sentiment, emotional status, and/or intention, as well as gain insights into a current attitude towards immigration, work permit applications, VISA programs, etc. Sentiment analysis may be performed by the sentiment module 134 to help the computing system 120 understand and/or learn a sentiment and/or current perception or status associated with the work permit application process, including a sentiment regarding whether country Y has positive attitude toward accepting work permit applicants, and the like. A sentiment may refer to whether the shared content, a feeling of a government authority, an attitude of the home country, and/or a context of the shared content, is positive, negative, or neutral. The sentiment may be derived from natural language processing and sentiment analysis techniques, and may be evaluated or scored on a range or sentiment scale. An intention may refer to an act that an agency or decision-making authority may take.

Embodiments of the sentiment module 134 may run a sentiment analysis (e.g. for all data sources) using emotion analysis classification models to retrieve a satisfaction data as an input to be used for calculating a sentiment score. In an exemplary embodiment, the sentiment module 134 may use a Naive Bayes classifier trained on customized emotion lexicon. In other embodiments, the sentiment module 134 may use computationally intensive classifiers, such as boosted trees, random forests, support vector machines, etc. The sentiment score may include a determination of an entity's emotional status (e.g. angry, frustrated, content, etc.). For example, the sentiment module 134 may determine whether an official is expressing a level of urgency, danger, importance, priority, etc., when releasing a story. The sentiment analysis may listen to citizens on social channels to learn a public perception or true emotion of a subject. The sentiment module 134 may be used to monitor changes in sentiment and emotion as a reaction to introductions of new immigration laws, work permit application approvals, requests, or other related news topics.

Moreover, embodiments of the sentiment module 134 may track occurrences of positive and negative sentiment and assign a point value to each occurrence (e.g. +2 points for negative sentiment occurrence, −1 point for positive sentiment occurrence). Various techniques may be employed to assigning a score or points to a sentiment occurrence. In an exemplary embodiment, the calculating module 132 may determine a degree of sentiment, such as positive, very positive, negative, very negative, etc., which may result in more points being assigned to a higher degree of positive/negative occurrences. By assigning a numeric value to each detected occurrence of sentiment relevant to the work permit application process, the sentiment module 134 may be able to calculate a user sentiment score (e.g. numeric value) based on the sentiment analysis of activity/content on one or more feeds 111.

Turning now to FIG. 3 for another example of analyzing a news feed (e.g. posts, shared content, etc.) on one or more feeds 111 to evaluate a sentiment. FIG. 3 depicts a news agency page 200*a* of a news agency 201*a*, containing shared content 230, in accordance with embodiments of the present invention. The 200*a* may include a news agency 201*a*. The sentiment module 134 may analyze the page 200*a*. Embodiments of the sentiment module 134 may perform a sentiment analysis and/or a personality analysis to the content on page 200*a* to determine a sentiment and/or intention. Sentiment analysis may be performed by the sentiment module 134 to help the computing system 120 understand and/or learn a sentiment associated with work permit application processes. In the comments 230, the news agency 201*a* posted "Jobs numbers increase for $3^{rd}$ quarter in a row." The sentiment module 134 may conclude that the news of increased jobs in a host country may affect a decision of a work permit application.

Moreover, embodiments of the sentiment module 134 may analyze a recent history of publicly available information for a specified data range. For instance, the calculating module 134 may analyze the recency of activity over a period of time, such as an hour, a day, a week, a couple of weeks, a month, a couple of months, a year, and the like. By analyzing a recent activity, the computing system 120 may follow or track changes in a particular host country's feelings about the work permit approval topic. At a time of the submission of the work permit application, the computing system 120 may recommend waiting a certain period of time to allow for a sentiment or trend to pass and/or change so that the work permit application may be approved rather than refused based on a current sentiment regarding work permit application processes.

Accordingly, the sentiment module 134 may use the sentiment scores to determine an overall impact score. The impact score, which may be an aggregation of the sentiment scores obtained during the sentiment analysis, may affect or adjust an overall prediction of the likelihood of success of the work permit application of an applicant. In other words, embodiments of the sentiment module 134 of the computing system 120 may apply the impact of the newsfeeds/social media sentiment analysis to the work permit approval process in the host and home country. The impact score, formed by the capturing and displaying of the sentiment, keywords, key themes as well as potentially high impact news items that may influence immigration authorities decisions and priorities in approving work permit applications, may affect an overall prediction of success of the work permit application being analyzed using the prediction application 130.

Figure 4:
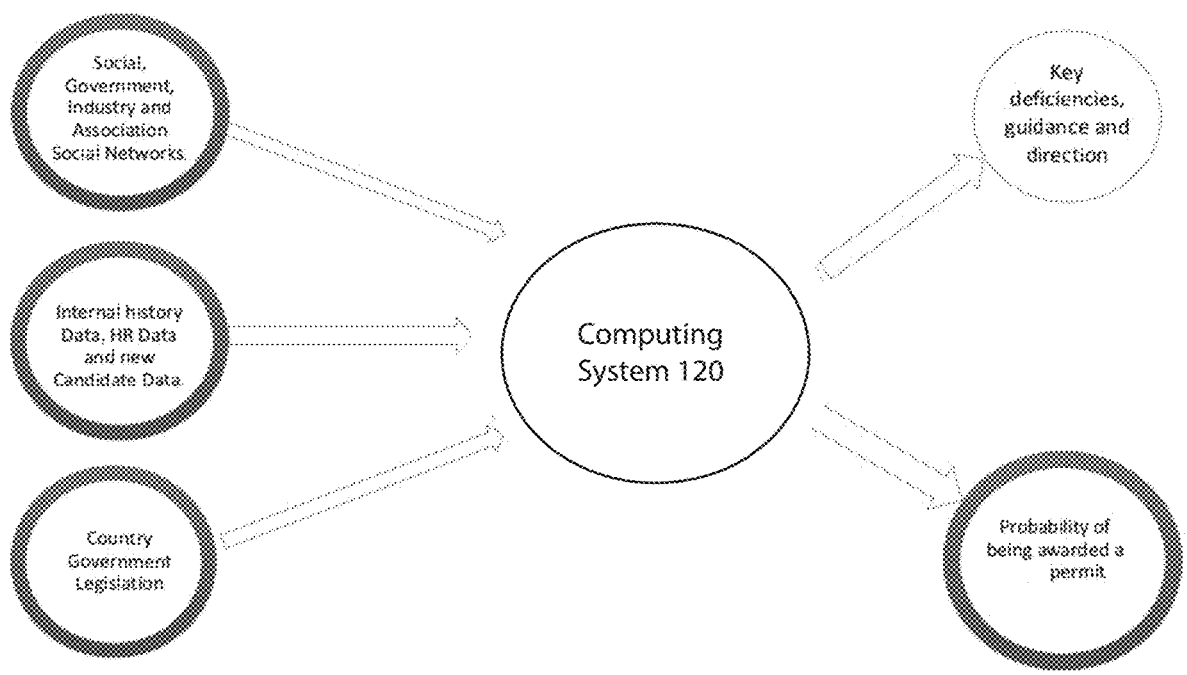
FIG. 4 depicts a diagram of various sources of information and data used by the computing system to determine an overall probability of success of a work permit application to be approved, in accordance with embodiments of the invention

Referring back to FIG. 1, embodiments of the computing system 120 may also include a prediction module 135. Embodiments of the prediction module 135 may include one or more components of hardware and/or software program code for determining an overall probability of success based on the first predicted probability, the second predicted probability, and the impact score. The prediction module 135 may use all three outputs to determine the overall probability of success, or may use a combination of less than three outputs. For instance, in some embodiments, the prediction module 135 may utilize only the first predicted probability and the impact score, or only the second predicted probability of success and the impact score, or only the first predicted probability of success and the second predicted probability of success and no impact score. FIG. 4 depicts a diagram of various sources of information and data used by the computing system 120 to determine an overall probability of success of a work permit application to be approved, in accordance with embodiments of the invention. Moreover, embodiments of the prediction module 135 may ingest the results from analytics module 132 and the sentiment module 134. The results may be fed into an overall probability of approval algorithm with a percentage weightings applicable to a respective host country. In an exemplary embodiment, the percentage weightings may be broken down as follows: Individual Assessment Result (Applicant Discrete Data Inputs)=35%, Individual Document Analyzer Result (Supporting Document Analysis)=55%, and Sentiment Result (Impact Score)=10%. The result from the overall probability algorithm may be displayed on a dashboard (e.g. on device 110) in the form of percentage probability along with key deficiencies and potentially high impact news items which could impact the approval outcome based on the respective country of work permit application submission. This overall assessment can be used and employer to make more fully informed decisions before submitting a work permit application. Further, the weighting percentage may be modified as applicable.

Various tasks and specific functions of the modules of the computing system 120 may be performed by additional modules, or may be combined into other module(s) to reduce the number of modules. Further, embodiments of the computer or computer system 120 may comprise specialized, non-generic hardware and circuitry (i.e., specialized discrete non-generic analog, digital, and logic-based circuitry) (independently or in combination) particularized for executing only methods of the present invention. The specialized discrete non-generic analog, digital, and logic-based circuitry may include proprietary specially designed components (e.g., a specialized integrated circuit, such as for example an Application Specific Integrated Circuit (ASIC), designed for only implementing methods of the present invention). Moreover, embodiments of the prediction system 100 offers an improvement over the existing art using a method to predict success of a work permit application using a cognitive approach to analyze and train data from previously submitted work permit and supporting documents to compare with new applications, in combination with determining a current sentiment to output a predicted probability of success. The prediction system 100 may be individualized to each applicant and to each application. Further, the prediction system 100 teaches curation and training of databases such that various weighting criteria can be modified over time, in accordance with changes in local laws and policies and general sentiment regarding work permit applications.

Figure 5:
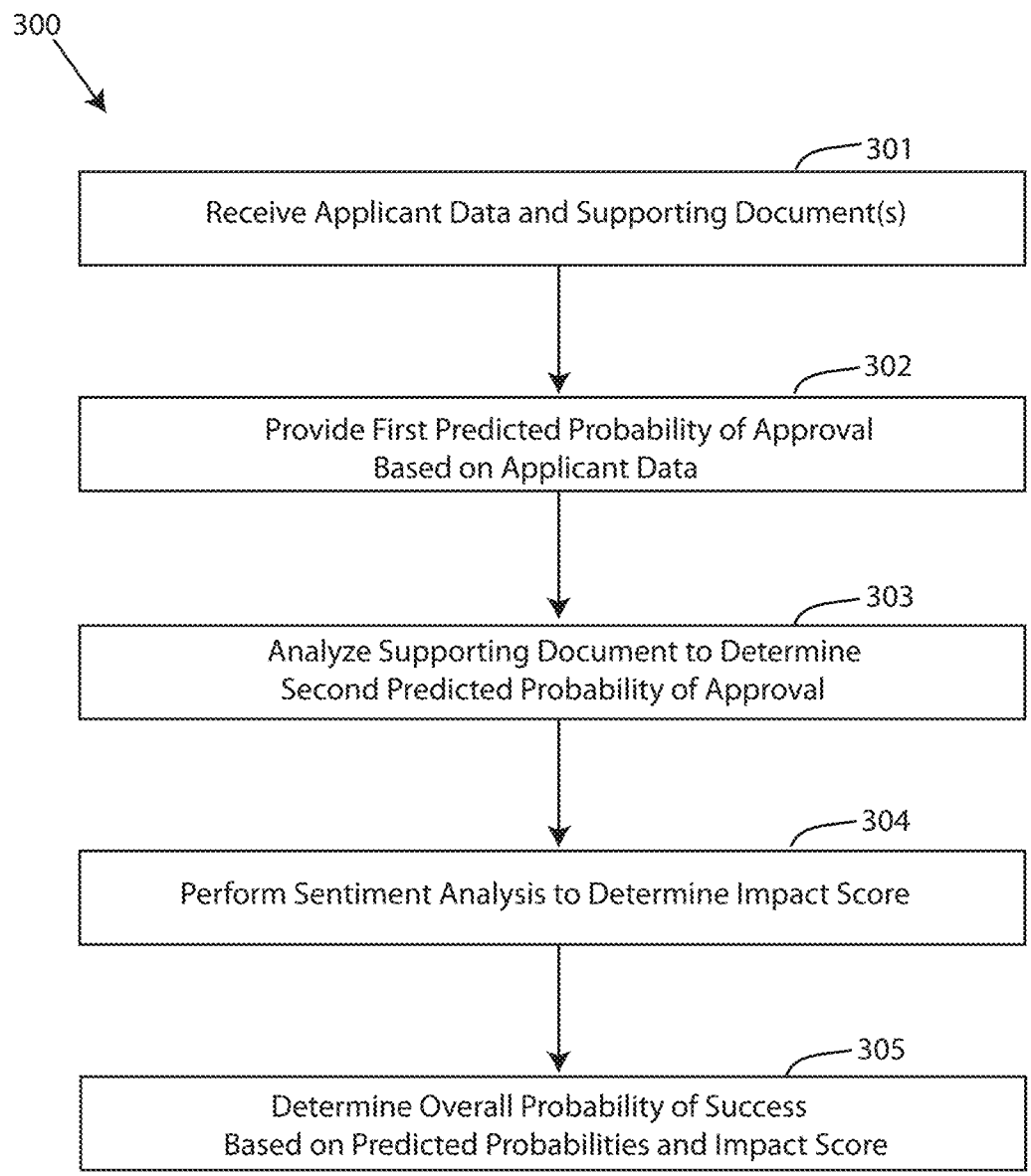
FIG. 5 depicts a flow chart of a method for predicting an overall probability of success that a work permit application submitted by a candidate will be approved, in accordance with embodiments of the present invention.

Referring now to FIG. 5, which depicts a flow chart of a method 300 for predicting an overall probability of success that a work permit application submitted by a candidate will be approved, in accordance with embodiments of the present invention. One embodiment of a method 300 or algorithm that may be implemented for predicting a success of a work permit application using the prediction system 100 described in FIGS. 1-4 using one or more computer systems as defined generically in FIG. 6 below, and more specifically by the specific embodiments of FIG. 1.

Embodiments of the method 300 for predicting an overall probability of success that a work permit application submitted by a candidate will be approved, in accordance with embodiments of the present invention, may begin at step 301 wherein applicant data and supporting documents are received. Step 302 provides a first predicted probability of approval based on the applicant discrete data inputs. Step 303 analyzes the supporting document(s) to determine a second predicted probability of approval. Step 304 performs a sentiment analysis to determine an impact score, which may influence or otherwise affect the prediction. Step 305 determines an overall probability of success based on the predicted probability of success from steps 302 and 303 and the impact score from step 306. Based on the overall prediction, the method 300 may also include a step of recommending the submission of the work permit application when the overall prediction of success exceeds an acceptable probability of success, as determined by the computing system 120, or predetermined and/or set by an entity seeking the work permit approval.

Figure 6:
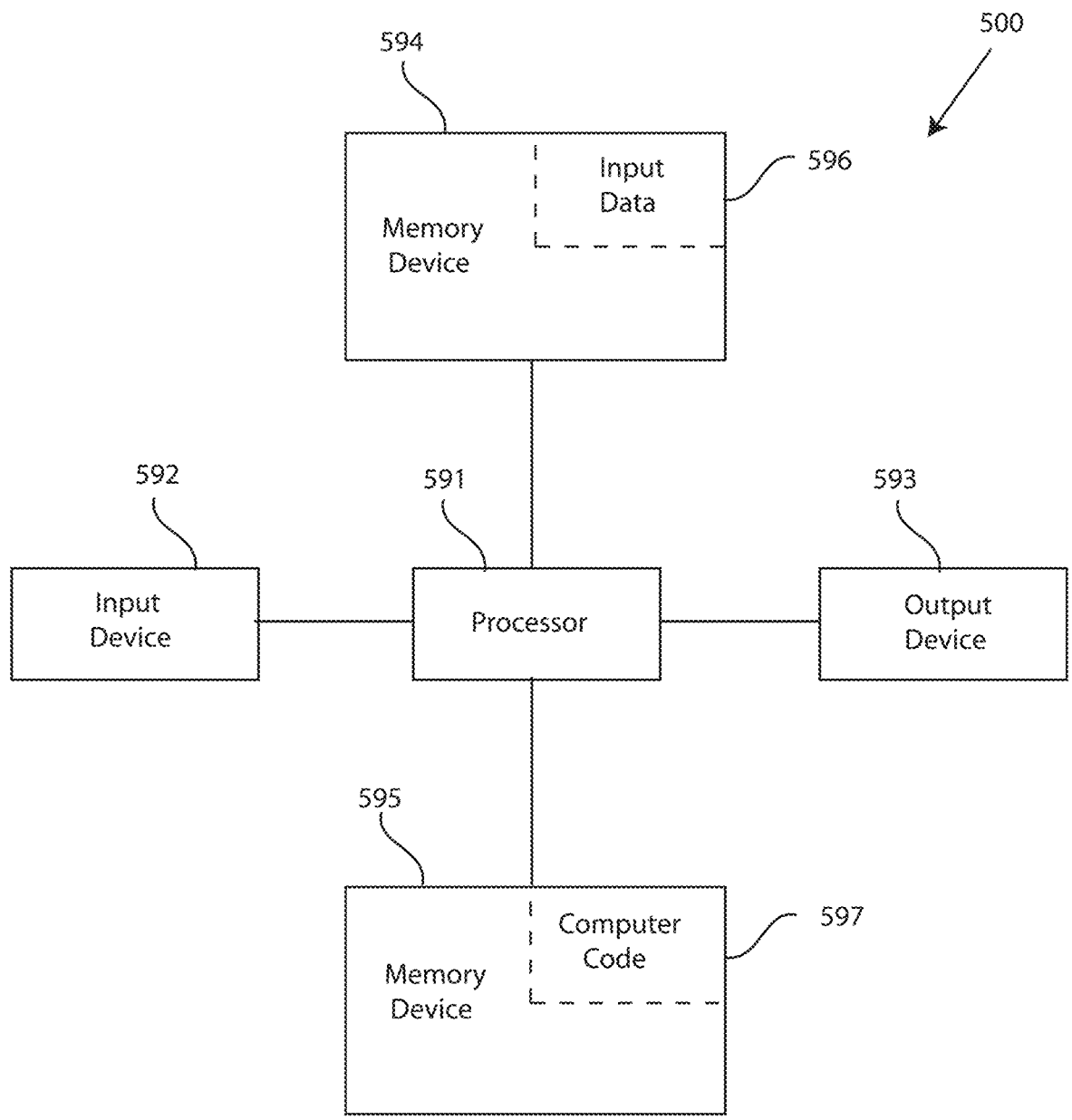
FIG. 6 depicts a block diagram of a computer system for the prediction system of FIGS. 1-4, capable of implementing methods for predicting an overall probability of success that a work permit application submitted by a candidate will be approved of FIG. 5, in accordance with embodiments of the present invention.

FIG. 6 depicts a block diagram of a computer system for the prediction system 100 of FIGS. 1-4, capable of implementing methods for determining an overall probability of success that a work permit application submitted by a candidate will be approved of FIG. 5, in accordance with embodiments of the present invention. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer system 500, including executing instructions included in the computer code 597 for the tools and programs capable of implementing a method for determining an overall probability of success that a work permit application submitted by a candidate will be approved in the manner prescribed by the embodiments of FIG. 5 using the prediction system 100 of FIGS. 1-4, wherein the instructions of the computer code 597 may be executed by processor 591 via memory device 595. The computer code 597 may include software or program instructions that may implement one or more algorithms for implementing the method for determining an overall probability of success that a work permit application submitted by a candidate will be approved, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer-readable program embodied therein and/or having other data stored therein, wherein the computer-readable program comprises the computer code 597. Generally, a computer program product (or, alternatively, an article of manufacture) of the computer system 500 may comprise said computer usable storage medium (or said program storage device).

Memory devices 594, 595 include any known computer-readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in FIG. 6.

In some embodiments, the computer system 500 may further be coupled to an Input/output (I/O) interface and a computer data storage unit. An I/O interface may include any system for exchanging information to or from an input device 592 or output device 593. The input device 592 may be, inter alia, a keyboard, a mouse, etc. or in some embodiments the touchscreen of a computing device. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 500, and may include any type of transmission link, including electrical, optical, wireless, etc.

An I/O interface may allow computer system 500 to store information (e.g., data or program instructions such as program code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository 125 as shown in FIG. 1.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to prediction systems and methods. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer system 500) including one or more processor(s) 591, wherein the processor(s) carry out instructions contained in the computer code 597 causing the computer system to determine an overall probability of success that a work permit application submitted by a candidate will be approved. Another embodiment discloses a process for supporting computer infrastructure, where the process includes integrating computer-readable program code into a computer system 500 including a processor.

The step of integrating includes storing the program code in a computer-readable storage device of the computer system 500 through use of the processor. The program code, upon being executed by the processor, implements a method for determining an overall probability of success that a work permit application submitted by a candidate will be approved. Thus, the present invention discloses a process for supporting, deploying and/or integrating computer infrastructure, integrating, hosting, maintaining, and deploying computer-readable code into the computer system 500, wherein the code in combination with the computer system 500 is capable of performing a method for determining an overall probability of success that a work permit application submitted by a candidate will be approved.

A computer program product of the present invention comprises one or more computer-readable hardware storage devices having computer-readable program code stored therein, said program code containing instructions executable by one or more processors of a computer system to implement the methods of the present invention.

A computer system of the present invention comprises one or more processors, one or more memories, and one or more computer-readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
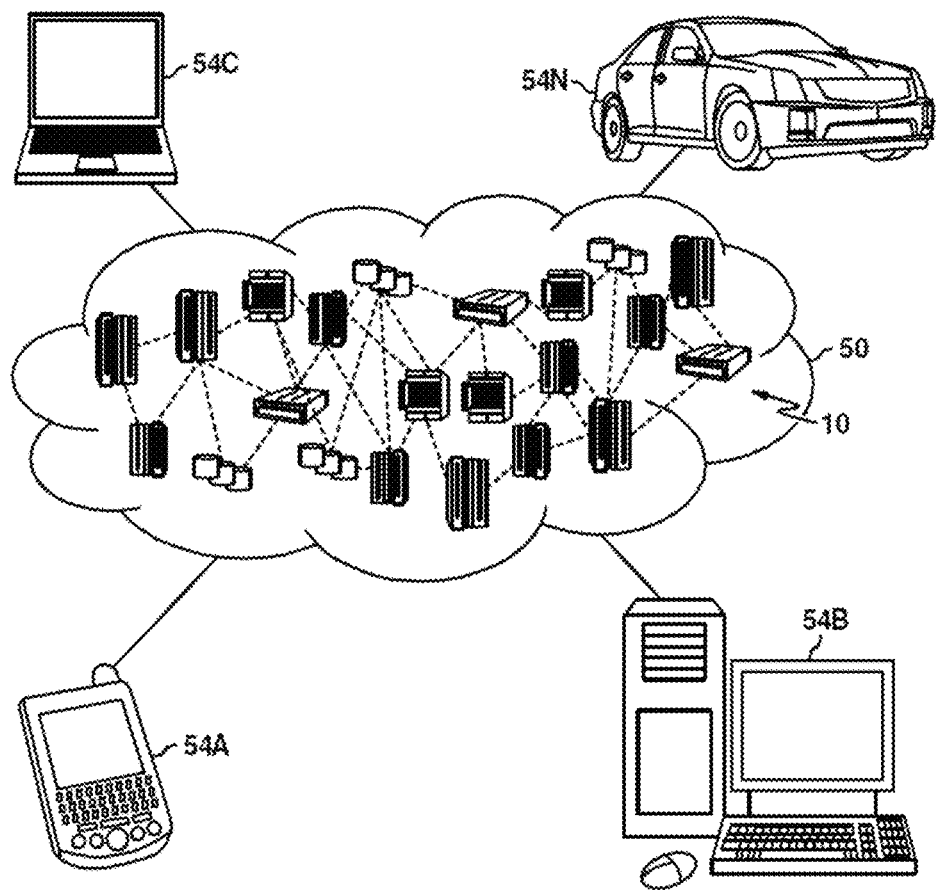
FIG. 7 depicts a cloud computing environment, in accordance with embodiments of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 7 are intended to be illustrative only and that computing nodes 10 and cloud computing environment 50 can communicate with any type of computerized device over any type of network and/or network addressable connection (e.g., using a web browser).

Figure 8:
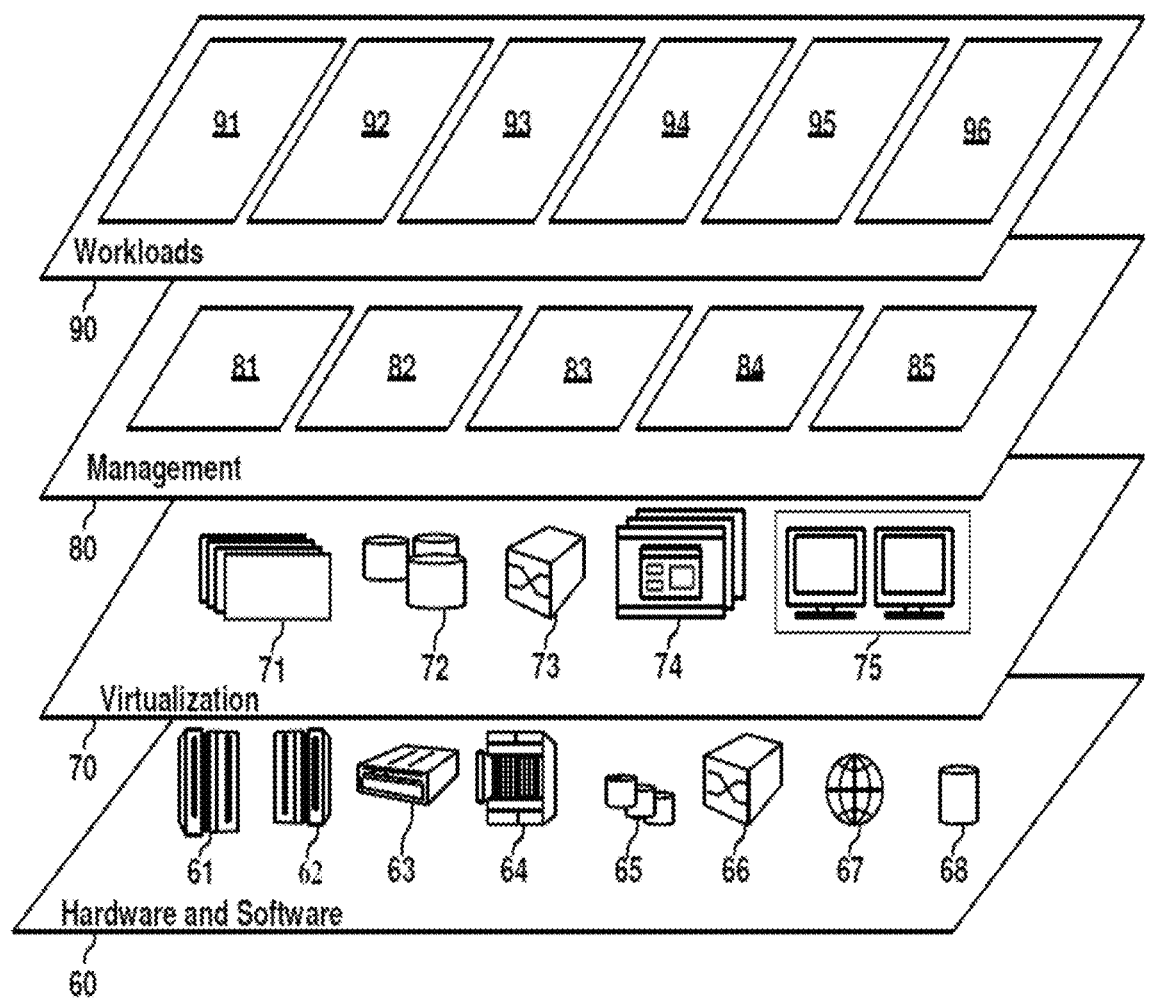
FIG. 8 depicts abstraction model layers, in accordance with embodiments of the present invention.

Referring now to FIG. 8, a set of functional abstraction layers provided by cloud computing environment 50 (see FIG. 7) are shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and prediction determination 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein

What is claimed is:

1. A method for determining an overall probability of success that a permit application submitted by an applicant will be approved, the method comprising:

receiving, by a first neural network coupled to a processor of a computing system, training data from a first database accessible by the processor;

identifying, by the first neural network, variables present in previously submitted permit applications that most significantly contribute to a successful outcome, which is defined as a first output;

receiving, by a second neural network coupled to the processor, training data from the first database;

inferring, by the second neural network, rules for determining an importance of a given criteria of the permit application submitted by the applicant, which is defined as a second output;

comparing, by the second neural network, the second output with a true outcome and based on the comparing, adjusting computations of the second neural network over time to improve an accuracy of the second output;

applying, by the processor, a weighting criteria to a plurality of discrete applicant data inputs;

determining, by the processor, a first predicted probability of approval based on the weighting criteria, the first output of the first neural network, and the second output of the second neural network;

analyzing, by the processor, at least one supporting document to determine a second predicted probability of approval of the permit application by comparing the at least one supporting document with previous applicant supporting documents stored in a second database accessible by the computing system, wherein the previous applicant supporting documents training data stored on the second database that accompanied previously submitted permit applications are processed by a natural language understanding application to output a list of keywords for each supporting document with a relevance score for each keyword, further wherein the keywords are aggregated;

performing, by the processor, a sentiment analysis on publicly available information correlating to at least one aspect of the permit application to determine an impact score on the permit application, wherein the publicly available information is captured from one or more news feeds and is processed by a natural language technique to determine keywords associated with the publicly available information available on the one or more news feeds, further wherein the keywords are analyzed to determine that the publicly available information correlates to the permit application; and determining, by the processor, the overall probability of success based on the first predicted probability of approval, the second predicted probability of approval, and the impact score.

2. The method of claim 1, wherein the plurality of discrete applicant data inputs include an employee job role, an experience level, an entity hiring the candidate, a host country, a home country, a salary information, a name, a work location, a prior assignment, a skill set, a date and time of a submission, and a duration of stay in the host country.

3. The method of claim 1, wherein the weighting criteria is based on: (i) a historical data of outcomes of previous permit applications submitted in various countries, (ii) an internal training data and relevant data sets for individual countries, (iii) an external training data and relevant data sets for individual countries, and (iv) human resource records from a home country and a host country for each previous applicant.

4. The method of claim 1, wherein natural language processing is used to determine keywords and associated relevance scores of the keywords of the at least one supporting document, for comparison with aggregated keywords and relevance scores of the previous application supporting documents stored in the second database to determine the second predicted probability of approval of the permit application.

5. The method of claim 1, further comprising: recommending, by the processor, a submission of the permit application when the overall prediction of success exceeds an acceptable probability of success.

6. A computer system, comprising:

a processor coupled to a first neural network and a second neural network;

a memory device coupled to the processor; and a computer readable storage device coupled to the processor, wherein the storage device contains program code executable by the processor via the memory device to implement a method for determining an overall probability of success that a permit application submitted by a candidate will be approved, the method comprising:

receiving, by the first neural network, training data from a first database accessible by the processor;

identifying, by the first neural network, variables present in previously submitted permit applications that most significantly contribute to a successful outcome, which is defined as a first output;

receiving, by a second neural network, training data from the first database, the second neural network coupled to the processor;

inferring, by the second neural network, rules for determining an importance of a given criteria of the permit application submitted by the applicant, which is defined as a second output;

comparing, by the second neural network, the second output with a true outcome and based on the comparing, adjusting computations of the second neural network over time to improve an accuracy of the second output;

applying, by the processor, a weighting criteria to a plurality of discrete applicant data inputs;

determining, by the processor, a first predicted probability of approval based on the weighting criteria, the first output of the first neural network, and the second output of the second neural network;

analyzing, by the processor, at least one supporting document to determine a second predicted probability of approval of the permit application by comparing the at least one supporting document with previous applicant supporting documents stored in a second database accessible by the computing system, wherein the previous applicant supporting documents training data stored on the second database that accompanied previously submitted permit applications are processed by a natural language understanding application to output a list of keywords for each supporting document with a relevance score for each keyword, further wherein the keywords are aggregated;

performing, by the processor, a sentiment analysis on publicly available information correlating to at least one aspect of the permit application to determine an impact score on the permit application, wherein the publicly available information is captured from one or more news feeds and is processed by a natural language technique to determine keywords associated with the publicly available information available on the one or more news feeds, further wherein the keywords are analyzed to determine that the publicly available information correlates to the permit application; and determining, by the processor, the overall probability of success based on the first predicted probability of approval, the second predicted probability of approval, and the impact score.

7. The computer system of claim 6, wherein the plurality of discrete applicant data inputs include an employee job role, an experience level, an entity hiring the candidate, a host country, a home country, a salary information, a name, a work location, a prior assignment, a skill set, a date and time of a submission, and a duration of stay in the host country.

8. The computer system of claim 6, wherein the weighting criteria is based on: (i) a historical data of outcomes of previous permit applications submitted in various countries, (ii) an internal training data and relevant data sets for individual countries, (iii) an external training data and relevant data sets for individual countries, and (iv) human resource records from a home country and a host country for each previous applicant.

9. The computer system of claim 6, wherein natural language processing is used to determine keywords and associated relevance scores of the keywords of the at least one supporting document, for comparison with aggregated keywords and relevance scores of the previous application supporting documents stored in the second database to determine the second predicted probability of approval of the permit application.

10. The computer system of claim 6, further comprising: recommending, by the processor, a submission of the permit application when the overall prediction of success exceeds an acceptable probability of success.

11. A computer program product, comprising a computer readable hardware storage device storing a computer readable program code, the computer readable program code comprising an algorithm that when executed by a computer processor of a computing system implements a method for determining an overall probability of success that a permit application submitted by a candidate will be approved, the method comprising:

receiving, by a first neural network coupled to a processor of a computing system, training data from a first database accessible by the processor;

identifying, by the first neural network, variables present in previously submitted permit applications that most significantly contribute to a successful outcome, which is defined as a first output;

receiving, by a second neural network coupled to the processor, training data from the first database;

inferring, by the second neural network, rules for determining an importance of a given criteria of the permit application submitted by the applicant, which is defined as a second output;

comparing, by the second neural network, the second output with a true outcome and based on the comparing, adjusting computations of the second neural network over time to improve an accuracy of the second output;

applying, by the processor, a weighting criteria to a plurality of discrete applicant data inputs;

determining, by the processor, a first predicted probability of approval based on the weighting criteria, the first output of the first neural network, and the second output of the second neural network;

analyzing, by the processor, at least one supporting document to determine a second predicted probability of approval of the permit application by comparing the at least one supporting document with previous applicant supporting documents stored in a second database accessible by the computing system, wherein the previous applicant supporting documents training data stored on the second database that accompanied previously submitted permit applications are processed by a natural language understanding application to output a list of keywords for each supporting document with a relevance score for each keyword, further wherein the keywords are aggregated;

performing, by the processor, a sentiment analysis on publicly available information correlating to at least one aspect of the permit application to determine an impact score on the permit application, wherein the publicly available information is captured from one or more news feeds and is processed by a natural language technique to determine keywords associated with the publicly available information available on the one or more news feeds, further wherein the keywords are analyzed to determine that the publicly available information correlates to the permit application; and determining, by the processor, the overall probability of success based on the first predicted probability of approval, the second predicted probability of approval, and the impact score.

12. The computer program product of claim 11, wherein the plurality of discrete applicant data inputs include an employee job role, an experience level, an entity hiring the candidate, a host country, a home country, a salary information, a name, a work location, a prior assignment, a skill set, a date and time of the submission, and a duration of stay in the host country.

13. The computer program product of claim 11, wherein the weighting criteria is based on: (i) a historical data of outcomes of previous permit applications submitted in various countries, (ii) an internal training data and relevant data sets for individual countries, (iii) an external training data and relevant data sets for individual countries, and (iv) human resource records from a home country and a host country for each previous applicant.

14. The computer program product of claim 11, wherein natural language processing is used to determine keywords and associated relevance scores of the keywords of the at least one supporting document, for comparison with aggregated keywords and relevance scores of the previous application supporting documents stored in the second database to determine the second predicted probability of approval of the permit application.

\* \* \* \* \*